US011235762B2

(12) United States Patent
Sugano et al.

(10) Patent No.: US 11,235,762 B2
(45) Date of Patent: Feb. 1, 2022

(54) VEHICLE STOP SUPPORT SYSTEM

(71) Applicant: Mazda Motor Corporation, Hiroshima (JP)

(72) Inventors: Takashi Sugano, Hiroshima (JP); Takuya Yamashita, Hiroshima (JP); Takesato Fushima, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 147 days.

(21) Appl. No.: 16/543,834

(22) Filed: Aug. 19, 2019

(65) Prior Publication Data

US 2020/0070824 A1    Mar. 5, 2020

(30) Foreign Application Priority Data

Aug. 28, 2018   (JP) .............................. JP2018-159067

(51) Int. Cl.
   *B60W 30/00*       (2006.01)
   *B60W 30/095*      (2012.01)
   (Continued)

(52) U.S. Cl.
   CPC .. *B60W 30/0956* (2013.01); *B60W 30/18109* (2013.01); *B60W 40/08* (2013.01); *G08G 1/166* (2013.01); *B60W 2040/0818* (2013.01); *B60W 2540/26* (2013.01); *B60W 2552/05* (2020.02); *B60W 2554/804* (2020.02); *B60W 2555/60* (2020.02)

(58) Field of Classification Search
   CPC ....... B60W 30/0956; B60W 30/18109; B60W 40/08; B60W 2554/804; B60W 2555/60; B60W 2552/05; B60W 2540/26; G08G 1/166
   See application file for complete search history.

(56) References Cited

U.S. PATENT DOCUMENTS 9,157,752 B1 * 10/2015 Fernandez Garcia . G01C 21/34
                                                            701/25
9,701,307 B1 *  7/2017 Newman ................ B60W 30/09
                                                            701/41
(Continued)

FOREIGN PATENT DOCUMENTS

JP    2017001519 A    1/2017
JP    2017190048 A    10/2017

*Primary Examiner* — Thomas G Black
*Assistant Examiner* — Brittany Renee Peko
(74) *Attorney, Agent, or Firm* — Alleman Hall Creasman & Tuttle LLP

(57) ABSTRACT

Provided is a vehicle stop support system for supporting vehicle stop in an emergency condition. The vehicle stop support system detects a physical abnormality of a driver; sets a target time period based on the detected abnormality; detects a plurality of stop point candidates in a traveling direction of a vehicle; estimates a time period required to reach each of the candidates; a estimates a rear-end collision risk which is a risk that, when assuming that the vehicle stops at each of the candidates, the vehicle will be rear-ended by a following vehicle; and a sets a stop point, wherein the system is operable to set, as the stop point, one of the candidates which satisfies a condition that the required time period estimated with respect thereto is equal to or less than the target time period and which is lowest in terms of the rear-end collision risk.

8 Claims, 7 Drawing Sheets

(51) Int. Cl.
*B60W 30/18* (2012.01)
*B60W 40/08* (2012.01)
*G08G 1/16* (2006.01)

(56) References Cited

U.S. PATENT DOCUMENTS

| | | | |
|---|---|---|---|
| 10,007,263 B1* | 6/2018 | Fields | G05D 1/0061 |
| | | | 701/23 |
| 10,156,848 B1* | 12/2018 | Konrardy | G05D 1/0214 |
| | | | 701/23 |
| 10,417,512 B2* | 9/2019 | Yamataka | G06K 9/00845 |
| | | | 340/439 |
| 10,913,457 B2* | 2/2021 | Yasui | B60W 30/17 |
| | | | 701/70 |
| 2015/0066284 A1* | 3/2015 | Yopp | B60W 30/00 |
| | | | 701/29 |
| 2017/0297567 A1 | 10/2017 | Matsumura | |
| 2019/0135291 A1* | 5/2019 | Sim | B60W 30/18163 |
| | | | 701/28 |
| 2019/0187701 A1* | 6/2019 | Zheng | G05D 1/0061 |
| | | | 701/23 |
| 2019/0202467 A1* | 7/2019 | Sun | B60W 50/082 |
| 2020/0086860 A1* | 3/2020 | Oguro | B60W 30/09 |
| | | | 701/23 |
| 2021/0001866 A1* | 1/2021 | Yoshimura | B60W 40/09 |
| | | | 340/576 |
| 2021/0122375 A1* | 4/2021 | Takamatsu | B60W 30/18163 |
| | | | 701/25 |

* cited by examiner

| Disorder/Disease | Target Time Period |
|---|---|
| Subarachnoid Hemorrhage Myocardial Infarction | T1 |
| Hypoglycemia | T2 |
| Epilepsy | T3 |

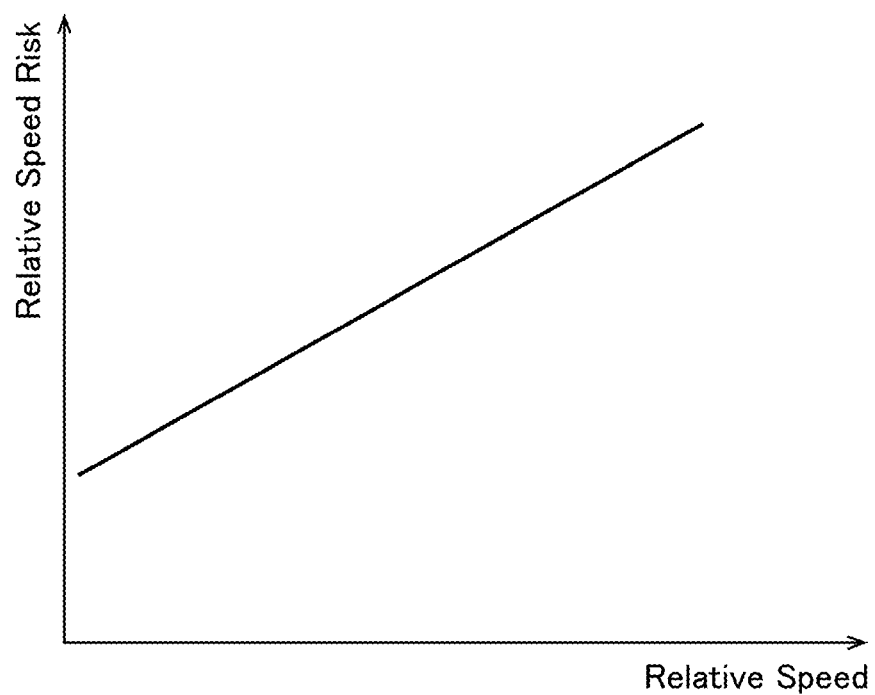

VEHICLE STOP SUPPORT SYSTEM

TECHNICAL FIELD

The present invention relates to a vehicle stop support system for supporting stop of a vehicle which is traveling.

BACKGROUND ART

There has been known a system for causing a vehicle to stop on behalf of a driver, in the event that the driver becomes unable to continue safe driving due to a sudden change in his/her body condition or the like (such a driver will hereinafter be referred to also as "driver in an emergency condition"). For example, in the following Patent Document 1, there is disclosed a system for causing a vehicle to stop in an evacuation space, upon detection of a physical abnormality of a driver. Further, as an improvement to such a system, in the Patent Document 2, there is disclosed prohibiting a vehicle from stopping in an area having poor visibility. This vehicle stop support system makes it possible to keep a driver in an emergency condition, a fellow passenger and other road user away from danger of a vehicle collision, and rescue the driver after stop of the vehicle.

CITATION LIST

Patent Document

Patent Document 1: JP 2017-001519A
Patent Document 2: JP 2017-190048A

SUMMARY OF INVENTION

Technical Problem

In recent years, along with development of technologies for automated vehicle driving, technologies concerning components such as a high-accuracy geographic map and a vehicle-mounted camera have been making great progress. In the field of vehicle stop support systems, it is expected to effectively utilize information provided from these components to support vehicle stop so as to further contribute to rescue of a driver in an emergency condition.

The present invention has been made to fulfill this demand, and an object of the present invention to provide a vehicle stop support system capable of supporting vehicle stop so as to further contribute to rescue of a driver in an emergency condition.

Solution to Technical Problem

In order to achieve the above object, the present invention provides a vehicle stop support system for supporting stop of a vehicle which is traveling. The vehicle stop support system comprises: an abnormality detection part for detecting a physical abnormality of a driver; a target time period setting part for setting a target time period based on the abnormality detected by the abnormality detection part; a candidate detection part for detecting a plurality of stop point candidates which exist in a traveling direction of the vehicle; a required time period estimation part for estimating a time period required to reach each of the stop point candidates; a risk estimation part for estimating a rear-end collision risk which is a risk that, when assuming that the vehicle stops at each of the stop point candidates, the vehicle will be rear-ended by a following vehicle; a stop point setting part for setting a stop point; and a vehicle control part for controlling the vehicle to travel to the stop point and stop at the stop point, wherein the stop point setting part is operable to set, as the stop point, one of the plurality of stop point candidates which satisfies a condition that the required time period estimated with respect thereto is equal to or less than the target time period and which is lowest in terms of the rear-end collision risk.

In the vehicle stop support system of the present invention having the above feature, the target time period is set based on the physical abnormality of the driver detected by the abnormality detection part. Thus, for example, by setting a relatively short target time period with respect to a physical abnormality having a relatively high urgency, it becomes possible to quickly stop the vehicle to start a rescue operation. On the other hand, by setting a relatively long target time period with respect to a physical abnormality having a relatively low urgency, it becomes possible to set the stop point from among a larger number of stop point candidates.

Further, in the vehicle stop support system of the present invention, one of the plurality of stop point candidates which is lowest in terms of the rear-end collision risk is set as the stop point. The rear-end collision risk is a risk that, when assuming that the vehicle (own vehicle) stops at each of the stop point candidates, the vehicle will be rear-ended by a following vehicle. Thus, according to the above feature, it becomes possible to stop the vehicle at a relatively safe stop point to start a rescue operation.

Preferably, in the vehicle stop support system of the present invention, the risk estimation part is operable to estimate the rear-end collision risk such that it becomes higher as a following vehicle visible distance with respect to each of the plurality of stop point candidates becomes smaller.

The "following vehicle visible distance" means the maximum value of a distance from the following vehicle to the own vehicle in a state in which the own vehicle is visible from the following vehicle. For example, in a situation where a vehicle stops on a curved or undulating road, or in a situation where there are obstacles such as walls or roadside trees around a road, the "following vehicle visible distance" with respect to a point where the vehicle stops is relatively small. On the other hand, in a situation where the vehicle stops on a straight or flat road, or in a situation where there are few obstacles around a road, the "following vehicle visible distance" with respect to a point where the vehicle stops is relatively large.

According to the above feature, the rear-end collision risk is estimated such that it becomes higher as the following vehicle visible distance with respect to each of the stop point candidates becomes smaller, i.e., as the stop point candidate has a higher degree of difficulty in allowing the following vehicle to be braked so as to avoid a rear-end collision. This makes it possible to stop the vehicle at a safer stop point to start a rescue operation.

Preferably, in the vehicle stop support system of the present invention, the risk estimation part is operable to estimate the rear-end collision risk such that it becomes higher as a relative speed of the following vehicle with respect to the vehicle which stops at each of the plurality of stop point candidates becomes larger.

According to this feature, the rear-end collision risk is estimated such that it becomes higher as the relative speed of the following vehicle with respect to the own vehicle which stops at each of the stop point candidates becomes larger, i.e., as the stop point candidate has a higher degree of difficulty in allowing the following vehicle to be braked so as to avoid a rear-end collision. This makes it possible to stop the vehicle at a safer stop point to start a rescue operation.

More preferably, in the above vehicle stop support system, the risk estimation part is operable to estimate the relative speed, based on an upper speed limit assigned to each of the plurality of stop point candidates in accordance with law or regulation.

This makes it possible to easily estimate the relative speed of the following vehicle with respect to the own vehicle which stops at each of the plurality of stop point candidates.

Preferably, in the vehicle stop support system of the present invention, the risk estimation part is operable to estimate the rear-end collision risk at each of the stop point candidates, such that the rear-end collision risk is lower when the stop point candidate is present in a road shoulder than when the stop point candidate is present only within a road.

The expression "the stop point candidate is present in a road shoulder" means that at least a part of the vehicle which stops at this stop point candidate is located in the road shoulder. Further, the expression "the stop point candidate is present only within a road" means that the vehicle which stops at this stop point candidate is located entirely within the road. It is empirically clear that a probability that the own vehicle is rear-ended in the road shoulder by the following vehicle is lower than a probability that the own vehicle is rear-ended within the road by the following vehicle.

According to the above feature, considering that a probability that the own vehicle which stops at any one of the stop point candidates is rear-ended by the following vehicle is relatively low when the stop point candidate is present in the road shoulder, the rear-end collision risk at each of the stop point candidates is estimated such that it is lower when the stop point candidate is present in the road shoulder than when the stop point candidate is present only within the road. This makes it possible to stop the vehicle at a safer stop point to start a rescue operation.

Preferably, in the vehicle stop support system of the present invention, the risk estimation part is operable to estimate the rear-end collision risk at each of the stop point candidates, such that the rear-end collision risk is lower when the stop point candidate is present in an emergency parking bay than when the stop point candidate is present in a road shoulder.

The expression "the stop point candidate is present in an emergency parking bay" means that at least a part of the vehicle which stops at this stop point candidate is located in the emergency parking bay. It is empirically clear that a probability that the own vehicle is rear-ended in the emergency parking bay by the following vehicle is lower than a probability that the own vehicle is rear-ended in the road shoulder by the following vehicle.

According to the above feature, considering that a probability that the own vehicle which stops at any one of the stop point candidates is rear-ended by the following vehicle is relatively low when the stop point candidate is present in the emergency parking bay, the rear-end collision risk at each of the stop point candidates is estimated, such that it is lower when the stop point candidate is present in the emergency parking bay than when the stop point candidate is present in the road shoulder. This makes it possible to stop the vehicle at a safer stop point to start a rescue operation.

Effect of Invention

The present invention can provide a vehicle stop support system capable of supporting vehicle stop so as to further contribute to rescue of a driver in an emergency condition.

BRIEF DESCRIPTION OF DRAWINGS

FIG. 8 is a graph for explaining a relative speed risk.

DESCRIPTION OF EMBODIMENTS

With reference to accompanying drawings, one embodiment of the present invention will now be described. For the sake of facilitating understanding of the description, the same reference sign is assigned to the same elements or components in the figures, and duplicated description of such a component will be omitted.

Figure 1:
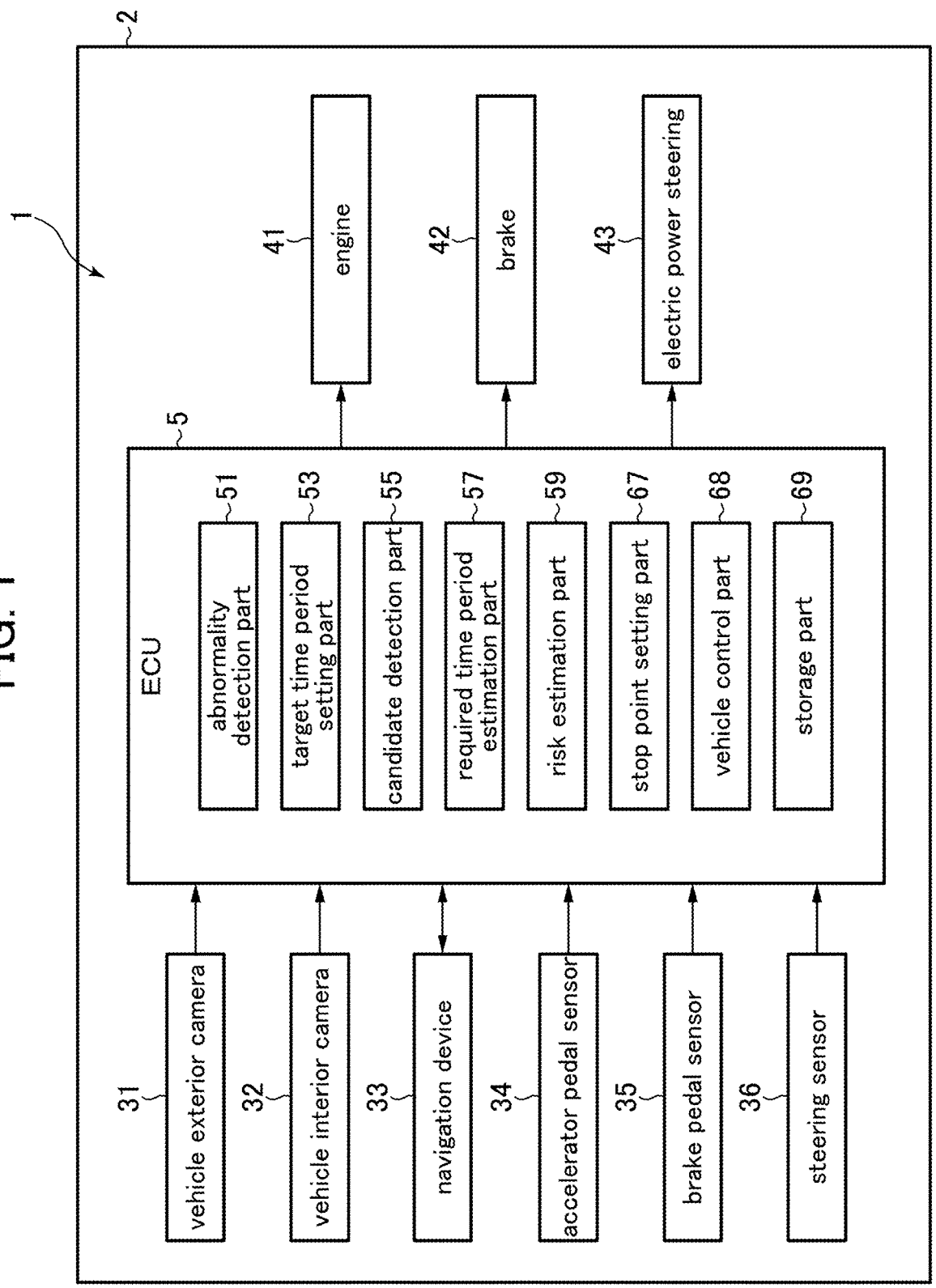
FIG. 1 is a block diagram showing a vehicle stop support system according to one embodiment of the present invention.

First of all, with reference to FIG. 1, the configuration of a vehicle stop system 1 (hereinafter referred to as "system 1") according to this embodiment will be described. FIG. 1 is a block diagram showing the system 1. The system 1 is equipped in a vehicle, and operable to support stop of the vehicle which is traveling, as an emergency measure. In this Description, a vehicle equipped with the system 1 will be referred to as "vehicle 2".

Further, in this Description, a forward movement direction of the vehicle 2 will be referred to as "front" or "forward", and a backward movement direction of the vehicle 2 will be referred to as "back" or "backward". Further, a left side with respect to the vehicle 2 oriented in the forward movement direction will be referred to as "left" or "leftward".

The system 1 comprises a vehicle exterior camera 31, a vehicle interior camera 32, a navigation device 33, an accelerator pedal sensor 34, a brake pedal sensor 35, a steering sensor 36, and an ECU (Electronic Control Unit) 5.

The vehicle exterior camera 31 is operable to take an image of the outside of the vehicle 2, particularly, the front of the vehicle 2, to acquire image data thereabout. The vehicle exterior camera 31 is composed of, e.g., an image sensor, and installed to a non-illustrated rearview mirror of the vehicle 2. The vehicle exterior camera 31 is also operable to transmit a signal corresponding to the acquired image data, to the ECU 5.

The vehicle interior camera 32 is operable to take an image of the inside of the vehicle 2 to acquire image data thereabout. Specifically, the vehicle interior camera 32 is operable to take an image of a range including the upper body of a driver in a passenger compartment of the vehicle 2. The vehicle interior camera 32 is composed of, e.g., an image sensor, and installed to a non-illustrated instrument panel of the vehicle 2. The vehicle interior camera 32 is also operable to transmit a signal corresponding to the acquired image data, to the ECU 5.

The navigation device 33 is capable of providing various information to a passenger of the vehicle 2. The navigation device 33 stores therein map information, or is capable of acquiring map information through communication with a server outside the vehicle 2. The map information contains a road configuration, an upper speed limit assigned to each road in accordance with law or regulation, and a traffic state of each road. The map information also contains information regarding points where ambulances are deployed, such as a fire department and a medical center. The navigation device 33 comprises a sensor for detecting the location of the vehicle 2, such as a GPS (Global Positioning System) sensor or a self-contained navigation sensor. The navigation device 33 is operable to provide, to the passenger, map information, and information regarding the position of the vehicle 2 on the map, a time period required for the vehicle 2 to reach a given point, and others, with sound or display. The navigation device 33 is configured to be communicable with the ECU 5, and operable, in response to a request from the ECU 5, to transmit a signal to the ECU 5, thereby providing a variety of information thereto.

The accelerator pedal sensor 34 is a sensor for detecting a depression amount of a non-illustrated accelerator pedal of the vehicle 2. The accelerator pedal sensor 34 is operable to transmit, to the ECU 5, a signal corresponding to the detected depression amount.

The brake pedal sensor 35 is a sensor for detecting a depression amount of a non-illustrated brake pedal of the vehicle 2. The brake pedal sensor 35 is operable to transmit, to the ECU 5, a signal corresponding to the detected depression amount.

The steering sensor 36 is a sensor for detecting a steering direction and a steering angle of a non-illustrated steering wheel of the vehicle 2. For example, the steering sensor 36 is provided with an encoder, and operable to count the number of slits in a plate rotatable together with the steering wheel. The steering sensor 36 is operable to transmit, to the ECU 5, a signal corresponding to the detected steering direction and steering angle.

The ECU 5 is a control device for controlling components through signal transmission and receiving with respect thereto. The ECU 5 is partly or entirely constructed as an analog circuit or as a digital processor. ECU 5 comprises an abnormality detection part 51, a target time period setting part 53, a candidate detection part 55, a required time period estimation part 57, a risk estimation part 59, a stop point setting part 67, a vehicle control part 68, and a storage part 69.

In FIG. 1, each function of the ECU 5 is shown as a block. However, it should be understood that a software modules incorporated in the analog circuit or digital processor of the ECU 5 needs not necessarily be divided as shown in FIG. 1. That is, each of the function block shown in FIG. 1 may be further segmentalized, or two or more of the function blocks may be integrated into a single function block which has functions of the two or more function blocks. It is apparent to a person of ordinary skill in the art that the internal configuration of the ECU 5 may be appropriately modified as long as the ECU 5 is configured to be capable of executing the after-mentioned processing routine.

The abnormality detection part 51 is configured to detect a physical abnormality of the driver of the vehicle 2. The abnormality detection part 51 is operable to detect the physical abnormality of the driver, based on signals received by the ECU 5 from the vehicle interior camera 32, the accelerator pedal sensor 34, the brake pedal sensor 35 and the steering sensor 36.

For example, the abnormality detection part 51 is operable to subject the image data acquired by the vehicle interior camera 32 to given processing to identify the upper body, head region, face, eyes, etc., of the driver and acquire information regarding the identified regions. Further, the abnormality detection part 51 is operable to detect information regarding driving manipulations of the driver, based on the signals received from the accelerator pedal sensor 34, the brake pedal sensor 35 and the steering sensor 36. Then, the abnormality detection part 51 is operable to perform a given calculation based on the acquired information to detect the state of consciousness of the driver, an open/closed state of the eyes of the driver, a line-of-sight direction of the driver, the position of the center of gravity of the driver, etc.

Further, the abnormality detection part 51 is operable to determine whether or not the line-of-sight direction of the driver is coincident with a traveling direction of the vehicle 2. Specifically, the abnormality detection part 51 is operable to determine whether or not the line-of-sight direction of the driver falls within a given range including the traveling direction of the vehicle 2. Additionally, the abnormality detection part 51 is operable to determine whether or not the center-of-gravity position of the driver is adequate, based on a distance from a seating surface of a seat on which the driver sits to the center of gravity of the driver.

Then, the abnormality detection part 51 is operable to perform a given calculation based on the above acquired information, to estimate a disorder/disease developing in the body of the driver. Examples of the disorder/disease include cerebrovascular diseases, heart diseases, gastrointestinal diseases, and syncope, which are difficult for the driver himself/ herself to predict sudden development thereof.

The target time period setting part 53 is operable to set a target time period, based on the abnormality detected by the abnormality detection part 51. As will be described later, the target time period setting part 53 is operable to set, as the target time period, a time period corresponding to a disorder/ disease developing in the body of the driver.

The candidate detection part 55 is configured to detect a stop point candidate. Here, a point at which the system 1 causes the vehicle 2 to stop will be referred to as "stop point", and a point which has a potential to become the stop point will be referred to as "stop point candidate". The candidate detection part 55 is operable to acquire map information based on a signal received from the navigation device 33, and detect a plurality of stop point candidates each of which exists in the traveling direction of the vehicle 2 in the acquired map information, and satisfies a given condition.

The required time period estimation part 57 is configured to estimate a time period required to reach each of the stop point candidates detected by the candidate detection part 55. Specifically, the required time period estimation part 57 is operable to search a course to each of the stop point candidates and determine a vehicle speed pattern of the vehicle 2 when the vehicle 2 travels along the course, and to estimate a time period required for the vehicle 2 to reach each of the stop point candidates, based on a corresponding set of the course and the vehicle speed pattern.

The risk estimation part 59 is configured to estimate a rear-end collision risk at each of the stop point candidates detected by the candidate detection part 55. Here, the "rear-end collision risk" means an index regarding a risk that, when assuming that the vehicle 2 stops at each of the stop point candidates, the vehicle 2 will be rear-ended by a following vehicle. The degree of the rear-end collision risk varies depending on a point. The details of estimation of the rear-end collision risk will be described later.

The stop point setting part 67 is configured to narrow down the plurality of stop point candidates detected by the candidate detection part 55, based on a given condition, or set one of the stop point candidates, as the stop point. The details of setting of the stop point will be described later.

The vehicle control part 68 is configured to control the behavior of the vehicle 2. Specifically, the vehicle control part 68 is operable to transmit control signals, respectively, to an engine 41 and a brake 42 of the vehicle 2, so as to control the vehicle speed of the vehicle 2. Further, the vehicle control part 68 is operable to subject the image data acquired by the vehicle exterior camera 31, to given processing, to detect a demarcation line of a road on which the vehicle 2 is traveling. Then, the vehicle control part 68 is operable to transmit, to an electric power steering 43, a control signal created based on the detected demarcation line, to control the traveling direction of the vehicle 2.

The storage part 69 is composed of, e.g., a non-volatile memory, and stores therein a variety of information. The information stored in the storage part 69 is read by the abnormality detection part 51 and others, and used for various calculations.

Figure 2:
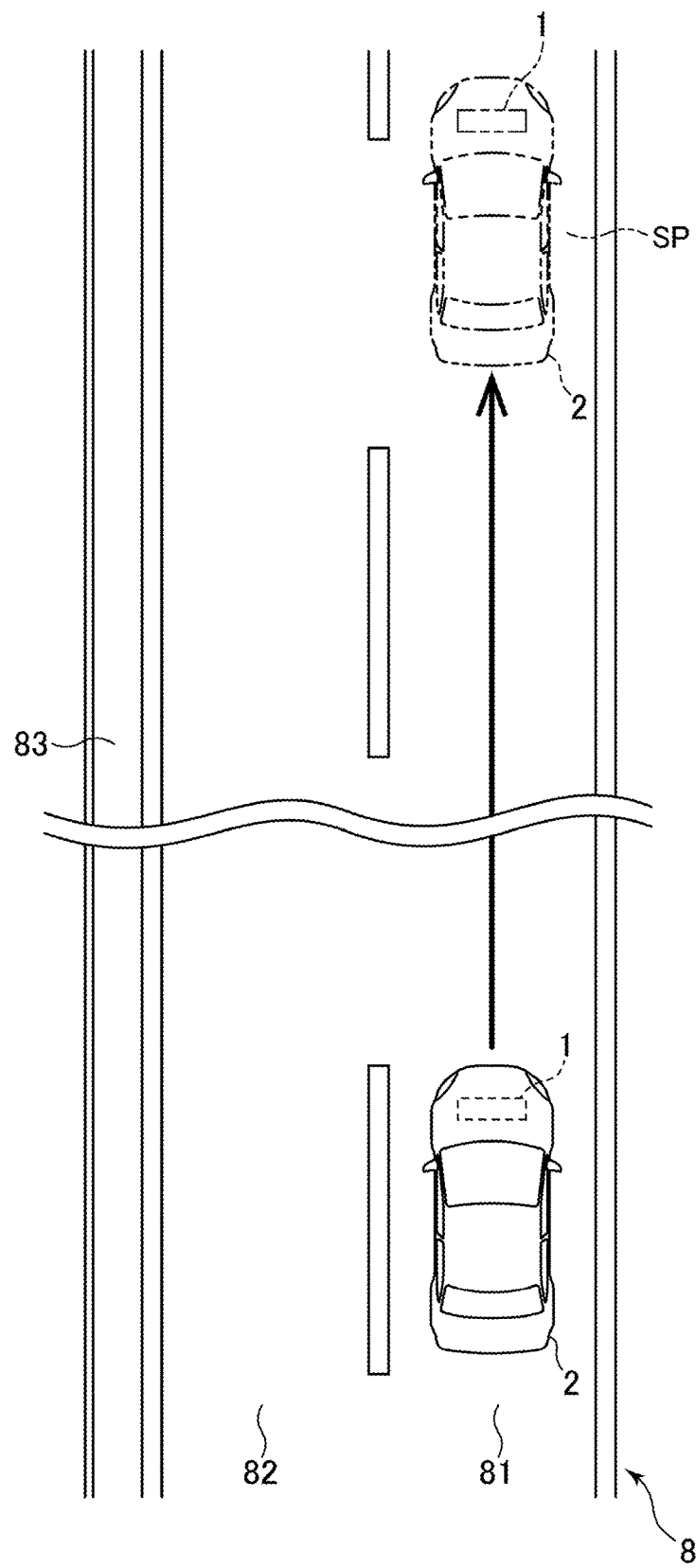
FIG. 2 is an explanatory diagram of a first pattern.
Figure 3:
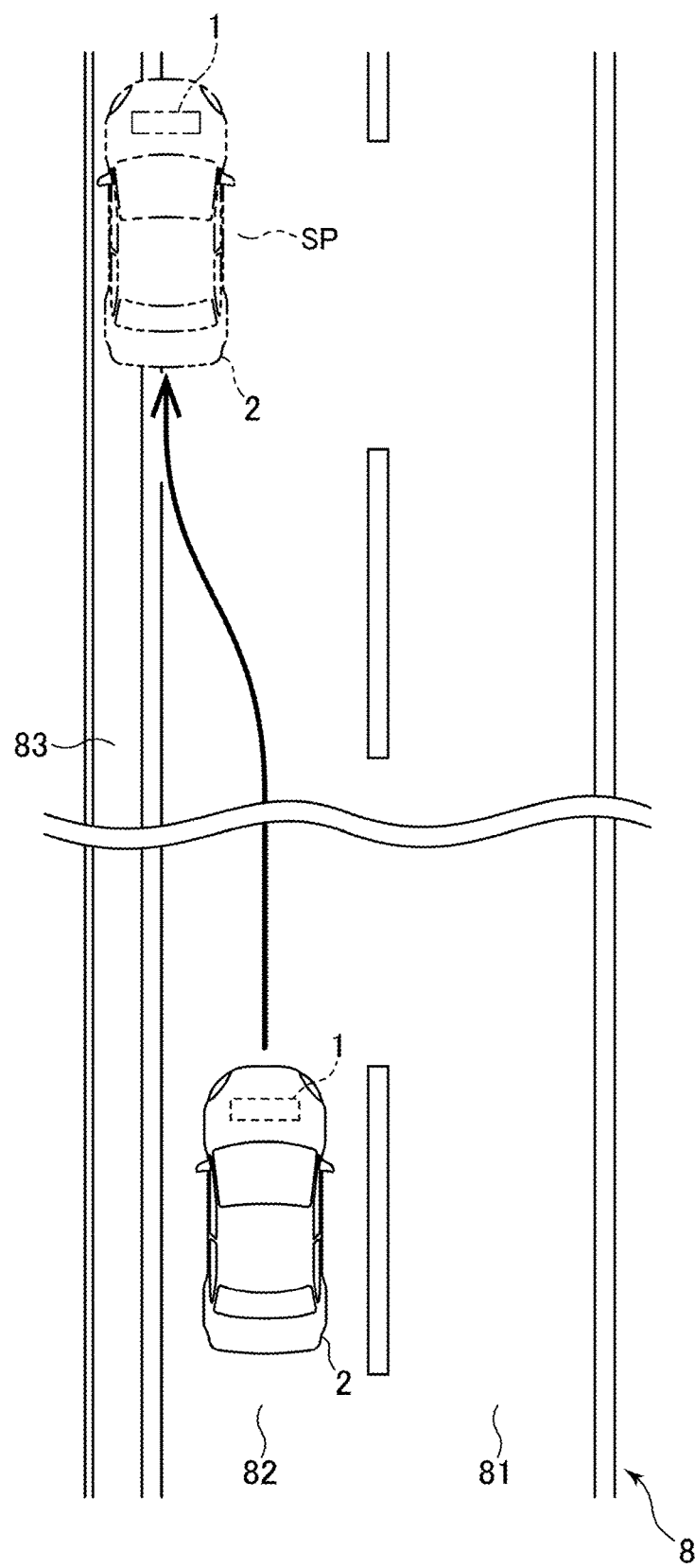
FIG. 3 is an explanatory diagram of a second pattern.
Figure 4:
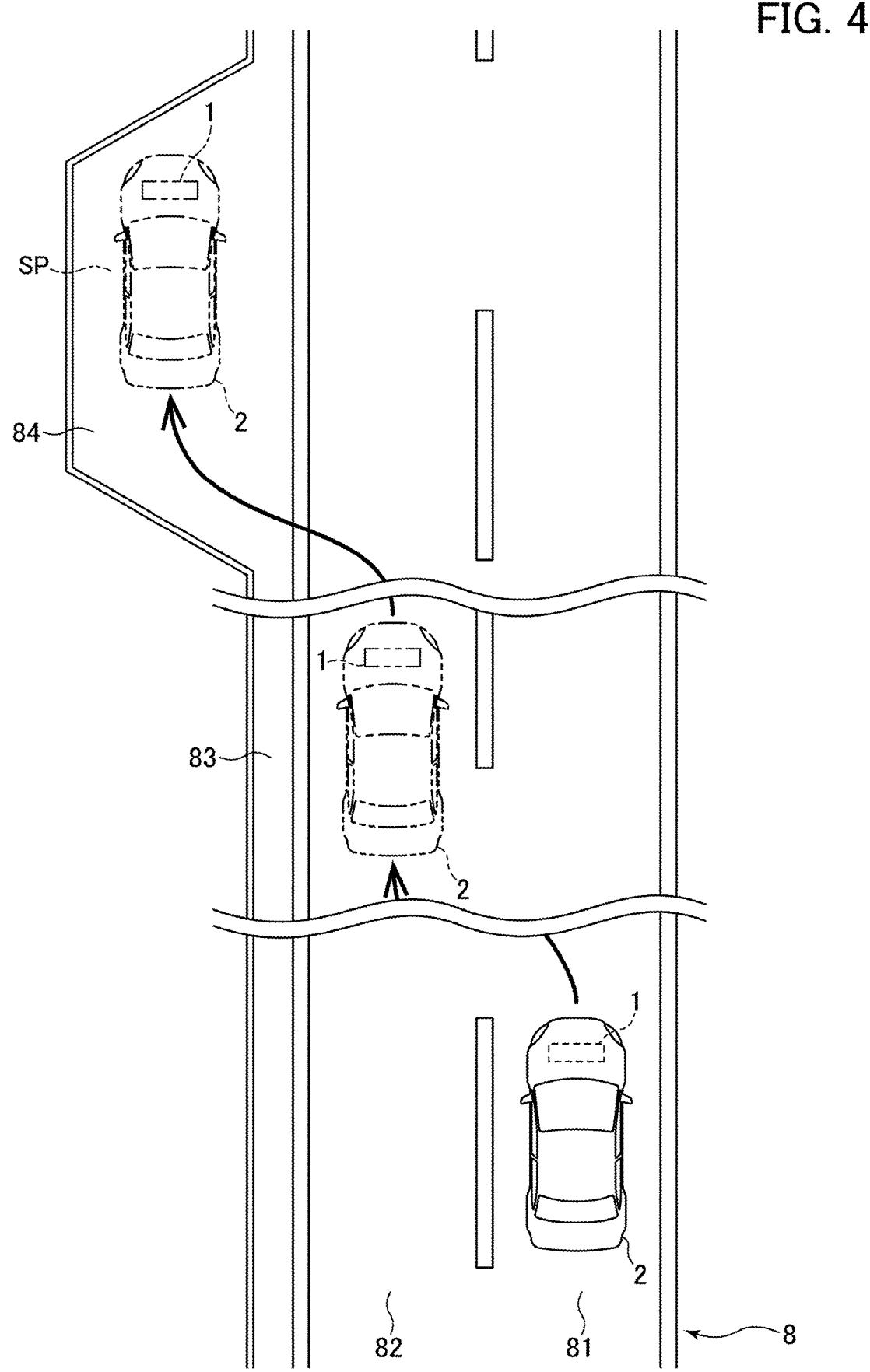
FIG. 4 is an explanatory diagram of a third pattern.

Next, with reference to FIGS. 2 to 4, control of the vehicle 2 by the system 1 will be described. FIGS. 2 to 4 show an environment where it is stipulated that any vehicle shall travel in the left lane, by law or regulation, like the Japanese traffic environment. A road 8 in FIGS. 2 to 4 is a four-lane road, wherein two lanes on one side consists of an overtaking lane 81 and a cruising lane 82. The system 1 is operable, upon satisfaction of a given condition during traveling of the vehicle 2, to control the vehicle 2 to stop at a stop point SP on behalf of the driver, as an emergency measure. The stop point SP is set in one of the following three patterns.

First Pattern

FIG. 2 shows a first pattern in which the stop point setting part 67 (see FIG. 1) of the system 1 operates to set a point within the road 8, as the stop point SP. Specifically, FIG. 2 shows a situation where a given condition is satisfied when the vehicle 2 is traveling in the overtaking lane 81, and a point located on the overtaking lane 81 in the traveling direction of the vehicle 2 is set as the stop point SP. In this situation, the vehicle control part 68 (see FIG. 1) of the system 1 operates to transmit a control signal to the electric power steering 43 (see FIG. 1) so as to controllably cause the vehicle 2 to keep traveling in the overtaking lane 81.

Second Pattern

FIG. 3 shows a second pattern in which the stop point setting part 67 of the system 1 operates to set a road shoulder 83 of the road 8, as the stop point SP. Specifically, FIG. 3 shows a situation where a given condition is satisfied when the vehicle 2 is traveling in the cruising lane 82, and a road shoulder 83 existing in the traveling direction of the vehicle 2 is set as the stop point SP. In this situation, the vehicle control part 68 of the system 1 operates to transmit a control signal to the electric power steering 43 so as to controllably cause the vehicle 2 to keep traveling in the cruising lane 82 and move forwardly and obliquely leftwardly in the vicinity of the stop point SP.

Third Pattern

FIG. 4 shows a third pattern in which the stop point setting part 67 of the system 1 operates to set an emergency parking bay 84 provided on the lateral side of the road 8, as the stop point SP. Specifically, FIG. 4 shows a situation where a given condition is satisfied when the vehicle 2 is traveling in the overtaking lane 81, and an emergency parking bay 84 existing in the traveling direction of the vehicle 2 is set as the stop point SP. In this situation, the vehicle control part 68 of the system 1 operates to transmit a control signal to the electric power steering 43 so as to controllably cause the vehicle 2 to first move from the overtaking lane 81 to the cruising lane 82 and to keep traveling in the cruising lane 82 and move forwardly and obliquely leftwardly in the vicinity of the stop point SP.

In any of the first to third patterns, the vehicle control part 68 operates to, until the vehicle 2 reaches the vicinity of the stop point SP, transmit a control signal to the engine 41 and the brake 42 so as to control the vehicle speed of the vehicle 2 such that it becomes lower than 50 lm/h. Then, the vehicle control part 68 operates to controllably cause the vehicle 2 to stop at the stop point SP. After stop of the vehicle 2, the system 1 operates to blink a blinker and/or sound an alarm to prevent the vehicle 2 from being rear-ended by a following vehicle, and inform the outside of a fact that the driver of the vehicle 2 is in need of rescue.

Figure 5:
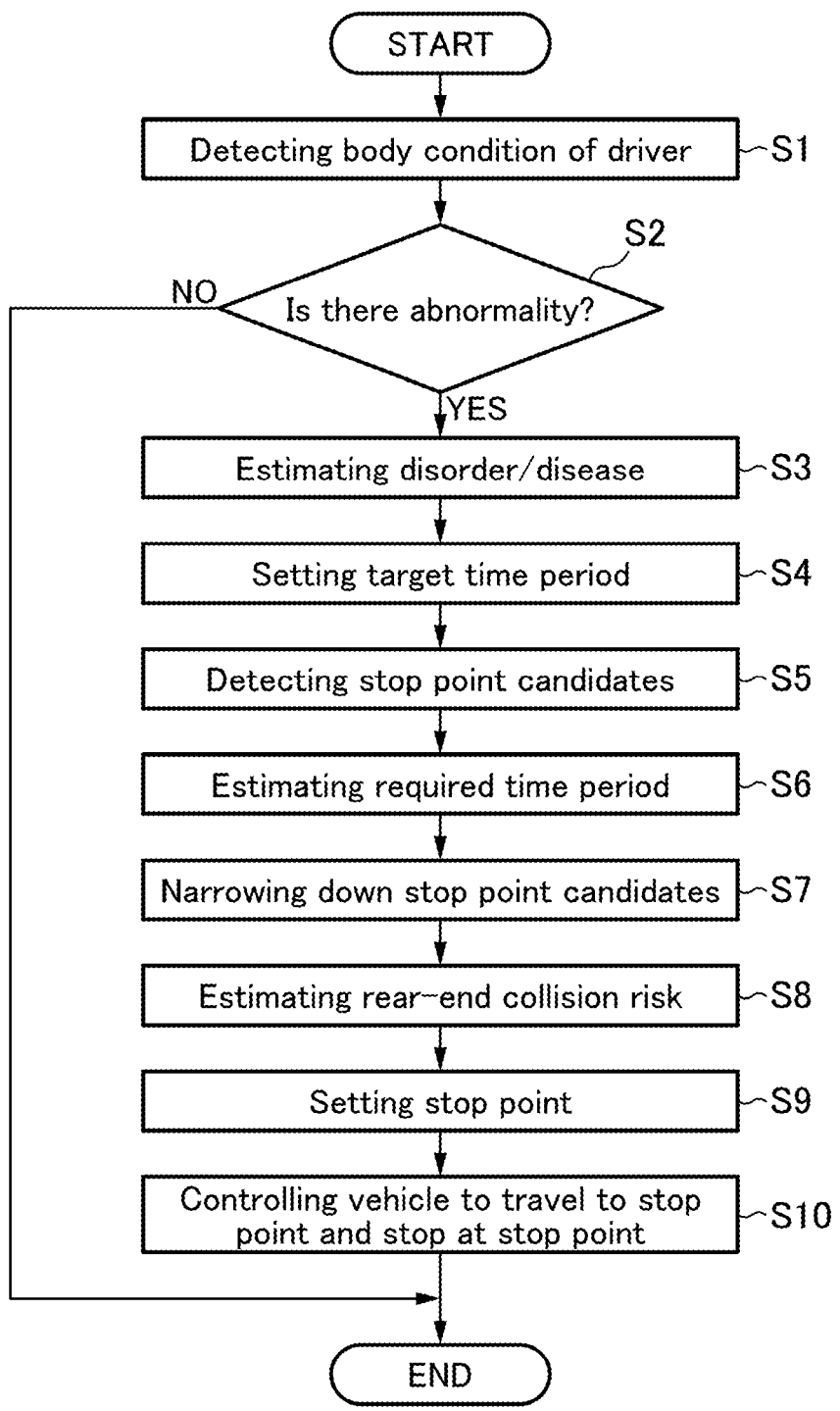
FIG. 5 is a flowchart showing a processing routine to be executed by an ECU.
Figures 6, 7:
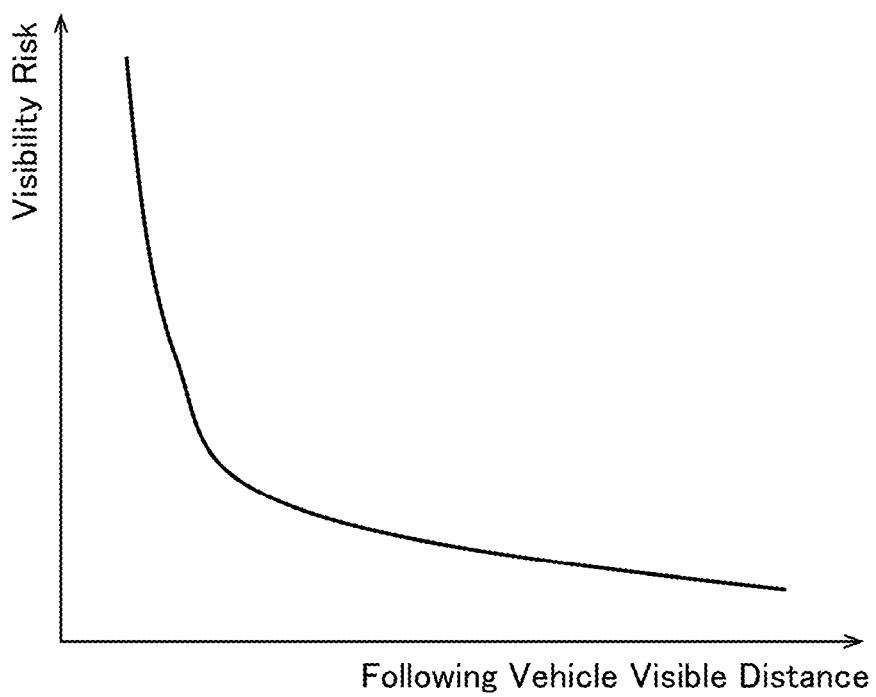
FIG. 6 is a table showing a correspondence relationship between a disorder/disease and a target time period.
FIG. 7 is a graph for explaining a visibility risk.

Next, with reference to FIGS. 5 to 8, a processing routine to be executed by the ECU 5 (see FIG. 1) will be described. FIG. 5 is a flowchart showing the processing routine to be executed by the ECU 5. During traveling of the vehicle 2, this processing routine will be repeatedly executed with a given period. FIG. 6 is a table showing a correspondence relationship between a disorder/disease and the target time period. FIG. 7 is a graph for explaining a visibility risk. FIG. 8 is a graph for explaining a relative speed risk. It should be noted that processing to be executed by each of the function blocks of the ECU 5 is also described as being executed by the ECU 5, in the lump, for the sake of simplicity of description.

First of all, in step S1 shown in FIG. 5, the ECU 5 operates to detect the body condition of the driver of the vehicle 2. Specifically, the ECU 5 operates to detect, based on the image data acquired by the vehicle interior camera 32 (see FIG. 1), the state of consciousness of the driver, the open/closed state of the eyes of the driver, the line-of-sight direction of the driver, the center-of-gravity position of the driver, etc.

In step S2, the ECU 5 operates to determine whether or not the driver has a physical abnormality. Specifically, the ECU 5 operates to determine, based on a result of the detection in the step S1, whether or not the driver has a physical abnormality which causes the driver to become unable to drive the vehicle 2 safely. For example, the ECU 5 may be configured to quantify the degree of consciousness of the driver, and, when the resulting quantified value is less than a given threshold, determine that the driver has a physical abnormality. When the driver is determined not to have any physical abnormality (S2: NO), the ECU 5 operates to terminate the vehicle stop support processing routine. On the other hand, when the driver is determined to have a physical abnormality (S2: YES), the ECU 5 proceeds to step S3.

In the step S3, the ECU 5 operates to estimate a disorder/disease of the driver. Specifically, the ECU 5 operates to estimate, based on the result of the detection in the step S1, a disorder/disease developing in the body of the driver. The ECU 5 is capable of estimating that one of subarachnoid hemorrhage, myocardial infarction, hypoglycemia and epilepsy develops.

In step S4, the ECU 5 operates to set a target time period. Specifically, the ECU 5 operates to set, as the target time period, a time period corresponding to the disorder/disease estimated in the step S3, based on the table shown in FIG. 6.

Data of the table shown in FIG. 6 is preliminarily stored in the storage part 69 (see FIG. 1). In FIG. 6, values of the target time periods T1, T2, T3 are different from each other, wherein each of the values corresponds to the degree of urgency of a corresponding disorder/disease. For example, with respect to a disorder/disease having a relatively high urgency and thus requiring possibly prompt rescue, a relatively short time period is set as the target time period. On the other hand, with respect to a disorder/disease having a relatively low urgency, a relatively long time period is set as the target time period.

In step S5, the ECU 5 operates to detect a stop point candidate. Specifically, the ECU 5 operates to acquire map information, based on a signal received from the navigation device 33, and detect a plurality of points each of which exists within 5 km from the vehicle 2 in the traveling direction of the vehicle 2, and satisfies a given condition, as a plurality of stop point candidates. The given condition may be set based on various factors such as properties of the vehicle 2, properties of the road on which the vehicle 2 is traveling, and the body condition of the driver detected in the step S1.

In step S6, the ECU 5 operates to estimate a time period required to reach each of the stop point candidates. Specifically, the ECU 5 operates to first search, based on a given algorithm, a course to each of the stop point candidates detected in the step S5, and determine a vehicle speed pattern of the vehicle 2 when the vehicle 2 travels along the course. Further, the ECU 5 operates to estimate a time period required to reach each of the stop point candidates, based on a corresponding set of the determined course and vehicle speed pattern.

In step S7, the ECU 5 operates to narrow down the stop point candidates. Specifically, in a case where N stop point candidates (where N is an integer of two or more) are detected in the step S5, the ECU 5 operates, in the step S7, to select and leave less-than-N stop point candidates each satisfying the given condition, among the N stop point candidates, and exclude the remaining one or more stop point candidates. More specifically, the ECU 5 operates to select and leave, among the plurality of stop point candidates detected in the step S5, one or more stop point candidates each satisfying a condition that the required time period estimated with respect thereto in the step S6 is equal to or less than the target time period set in the step S4.

In step S8, the ECU 5 operates to estimate a rear-end collision risk at each of the stop point candidates. Specifically, the ECU 5 operates to estimate a risk that, when assuming that the vehicle 2 stops at each of the stop point candidates narrowed down in the step S7, the vehicle 2 will be rear-ended by a following vehicle.

Here, the estimation of the rear-end collision risk will be described in detail. The rear-end collision risk is calculated based on a "visibility risk" and a "relative speed risk", as expressed by the following formula f1.

(Rear-End Collision Risk)=(Visibility Risk)*(Relative Speed Risk)　　　(f1)

The "visibility risk" means a risk factor which increases along with an increase in difficulty in visually recognizing the vehicle 2 which stops, from a following vehicle. For example, the "visibility risk" is expressed by the graph in FIG. 7.

A "following vehicle visible distance" described in FIG. 7 means the maximum value of a distance from a following vehicle to the vehicle 2 in a state in which the vehicle 2 which stops is visible from the following vehicle. The "following vehicle visible distance" varies depending on a point where the vehicle 2 stops. For example, in a situation where the vehicle 2 stops on a curved or undulating road, or in a situation where there are obstacles such as walls or roadside trees around a road, the "following vehicle visible distance" with respect to a point where the vehicle stops is relatively small. On the other hand, in a situation where the vehicle 2 stops on a straight or flat road, or in a situation where there are few obstacles around a road, the "following vehicle visible distance" with respect to a point where the vehicle 2 stops is relatively large.

Along with a decrease in the "following vehicle visible distance", it becomes more difficult for a following vehicle to be braked so as to avoid a rear-end collision, so that the "visibility risk" becomes higher. The navigation device 33 stores therein map information, as mentioned above, and the visibility risk at each point of roads contained in the map information is preliminarily estimated and stored in the storage part 69 (see FIG. 1).

The "relative speed risk" means a risk factor which increases as a following vehicle is approaching the vehicle 2 at a higher vehicle speed. For example, the "relative speed risk" is expressed by the graph in FIG. 8. Along with an increase in relative speed of the following vehicle with respect to the vehicle 2 which stops, the "relative speed risk" becomes higher. The relationship between the relative speed and the "relative speed risk" is set based on a phenomenon that, as the relative speed becomes larger, it becomes more difficult for the following vehicle to be braked so as to avoid a rear-end collision, and therefore a risk that the following vehicle rear-ends the vehicle 2 becomes higher.

The ECU 5 operates to calculate the relative speed of the following vehicle with respect to the vehicle 2 which stops (vehicle speed: 0 km/h), on the assumption that the following vehicle is traveling at an upper speed limit assigned to each of the stop point candidates in accordance with law or regulation. That is, in a case where the upper speed limit assigned to one of the stop point candidates in accordance with law or regulation is 100 km/h, the relative speed is also 100 km/h. Data of the graphs shown in FIG. 7 and FIG. 8 is preliminarily stored in the storage part 69 (see FIG. 1).

The ECU 5 operates to read, from the storage part 69, the "visibility risk" at each of the stop point candidates narrowed down in the step S7, and the "relative speed risk" corresponding to the relative speed at each of the stop point candidates. Then, the ECU 5 operates to calculate the rear-end collision risk by assigning the read "visibility risk" and "relative speed risk" to the formula f1. As can be understood from the formula f1 and the relationships shown in FIGS. 7 and 8, the rear-end collision risk becomes higher as the following vehicle visible distance with respect to each of the stop point candidates becomes smaller. Further, the rear-end collision risk becomes higher as the relative speed of the following vehicle with respect to the vehicle 2 at each of the stop point candidates becomes larger.

The ECU 5 may be configured to estimate the rear-end collision risk based on a detailed location of each of the stop point candidates, in addition to or in place of the estimation of the rear-end collision risk based on the formula f1. The estimation of the rear-end collision risk based on the detailed location of each of the stop point candidates will be described below.

A risk that the vehicle 2 is rear-ended by a following vehicle largely varies, depending on at which of the three stop points SP as shown in FIGS. 2 to 4 the vehicle 2 stops. A probability that the vehicle 2 is rear-ended by a following vehicle when the vehicle 2 stops at the stop point SP set in the road shoulder 83 as in the second pattern (see FIG. 3) is empirically clearly lower than a probability that the vehicle 2 is rear-ended by a following vehicle when the vehicle 2 stops at the stop point SP set only within the road 8 as in the first pattern (see FIG. 2). Further, generally, a vehicle speed of a vehicle traveling in the overtaking lane 81 is greater than that of a vehicle traveling in the cruising lane 82. Therefore, even within the road 8, a probability that the vehicle 2 is rear-ended by a following vehicle when the vehicle 2 stops in the overtaking lane 81 is also empirically clearly higher than a probability that the vehicle 2 is rear-ended by a following vehicle when the vehicle 2 stops in the cruising lane 82. Furthermore, a probability that the vehicle 2 is rear-ended by a following vehicle when the vehicle 2 stops at the stop point SP set in the emergency parking bay 84 as in the third pattern (see FIG. 4) is empirically clearly lower than a probability that the vehicle 2 is rear-ended by a following vehicle when the vehicle 2 stops in the road shoulder 83.

Therefore, in the estimation of the rear-end collision risk based on the detailed location of each of the stop point candidates, values of the rear-end collision risk each corresponding to a respective one of the road, the road shoulder and the emergency parking bay are preliminarily stored in the storage part 69. The value of the rear-end collision risk at the road shoulder is smaller than the value of the rear-end collision risk at the road. Further, the value of the rear-end collision risk at the emergency parking bay is smaller than the value of the rear-end collision risk at the road shoulder. In the step S8, the ECU 5 operates to read, from the storage part 69, one or more of the values of the rear-end collision risk at the road, the road shoulder and the emergency parking bay, corresponding to the one or more stop point candidates narrowed down in the step S7.

In step S9, the ECU 5 operates to set a stop point. Specifically, the ECU 5 operates to set, among the stop point candidates narrowed down in the step S7, one stop point candidate which is lowest in terms of the rear-end collision risk estimated in the step S8, as a stop point.

In step S10, the ECU 5 operates to control traveling of the vehicle 2 to the stop point and stop of the vehicle 2 at the stop point. Specifically, the ECU 5 operates to transmit control signals, respectively, to the engine 41, the brake 42 and the electric power steering 43 (see FIG. 1) so as to controllably cause the vehicle 2 to travel to the stop point and stop at the stop point. During this process, the manipulation of the accelerator pedal by the driver is invalidated. On the other hand, the manipulation of the brake pedal by the driver is validated. This is because, even when the driver is becoming unconscious, he/she is likely to attempt to stop the vehicle 2 so as to avoid collision with an obstacle. Here, the vehicle 2 may be configured such that a system for stabilizing the behavior of the vehicle 2, such as an anti-lock braking system or an antiskid brake system, is activated during traveling of the vehicle 2.

Functions/Effects of Embodiment

In the system 1 according to the above embodiment, the target time period is set based on the physical abnormality of the driver detected by the abnormality detection part 51. Thus, by setting a relatively short target time period with respect to a physical abnormality having a relatively high urgency, it becomes possible to quickly stop the vehicle 2 to start a rescue operation. On the other hand, by setting a relatively long target time period with respect to a physical abnormality having a relatively low urgency, it becomes possible to set the stop point from among a larger number of stop point candidates.

Further, in the above embodiment, one of the plurality of stop point candidates which is lowest in terms of the rear-end collision risk is set as the stop point. The rear-end collision risk is a risk that, when assuming that the vehicle 2 stops at each of the stop point candidates, the vehicle 2 will be rear-ended by a following vehicle. Thus, according to the above feature, it becomes possible to stop the vehicle 2 at a relatively safe stop point to start a rescue operation.

In the above embodiment, the risk estimation part 59 is operable to estimate the rear-end collision risk such that it becomes higher as a following vehicle visible distance with respect to each of the plurality of stop point candidates becomes smaller.

According to this feature, the rear-end collision risk is estimated such that it becomes higher as the following vehicle visible distance with respect to each of the stop point candidates becomes smaller, i.e., as the stop point candidate has a higher degree of difficulty in allowing the following vehicle to be braked so as to avoid a rear-end collision. This makes it possible to stop the vehicle 2 at a safer stop point to start a rescue operation.

In the above embodiment, the risk estimation part 59 is operable to estimate the rear-end collision risk such that it becomes higher as a relative speed of the following vehicle with respect to the vehicle 2 which stops at each of the plurality of stop point candidates becomes larger.

According to this feature, the rear-end collision risk is estimated such that it becomes higher as the relative speed of the following vehicle with respect to the vehicle 2 which stops at each of the stop point candidates becomes larger, i.e., as the stop point candidate has a higher degree of difficulty in allowing the following vehicle to be braked so as to avoid a rear-end collision. This makes it possible to stop the vehicle 2 at a safer stop point to start a rescue operation.

In the above embodiment, the risk estimation part 59 is operable to estimate the relative speed, based on an upper speed limit assigned to each of the plurality of stop point candidates in accordance with law or regulation.

This makes it possible to easily estimate the relative speed of the following vehicle with respect to the vehicle 2 which stops at each of the plurality of stop point candidates.

In the above embodiment, the risk estimation part 59 is operable to estimate the rear-end collision risk at each of the stop point candidates, such that the rear-end collision risk is lower when the stop point candidate is present in a road shoulder than when the stop point candidate is present only within a road.

The expression "the stop point candidate is present in a road shoulder" means that at least a part of the vehicle 2 which stops at this stop point candidate is located in the road shoulder. Further, the expression "the stop point candidate is present only within a road" means that the vehicle 2 which stops at this stop point candidate is located entirely within the road.

According to the above feature, considering that a probability that the vehicle 2 which stops at any one of the stop point candidates is rear-ended by the following vehicle is relatively low when the stop point candidate is present in the road shoulder, the rear-end collision risk at each of the stop point candidates is estimated such that it is lower when the stop point candidate is present in the road shoulder than when the stop point candidate is present only within the road. This makes it possible to stop the vehicle 2 at a safer stop point to start a rescue operation.

In the above embodiment, the risk estimation part 59 is operable to estimate the rear-end collision risk at each of the stop point candidates, such that the rear-end collision risk is lower when the stop point candidate is present in an emergency parking bay than when the stop point candidate is present in a road shoulder.

The expression "the stop point candidate is present in an emergency parking bay" means that at least a part of the vehicle 2 which stops at this stop point candidate is located in the emergency parking bay.

According to the above feature, considering that a probability that the vehicle 2 which stops at any one of the stop point candidates is rear-ended by the following vehicle is relatively low when the stop point candidate is present in the emergency parking bay, the rear-end collision risk at each of the stop point candidates is estimated, such that it is lower when the stop point candidate is present in the emergency parking bay than when the stop point candidate is present in the road shoulder. This makes it possible to stop the vehicle 2 at a safer stop point to start a rescue operation.

As above, the present invention has been described based on one specific embodiment. However, it should be understood that the present invention is not limited to the specific embodiment. That is, various changes and modifications will be apparent to a person of ordinary skill in the art. Therefore, unless otherwise such changes and modifications depart from the scope of the present invention hereinafter defined, they should be construed as being included therein.

In the above embodiment, the abnormality detection part 51 of the ECU 5 is configured to detect the physical abnormality of the driver based on image data acquired by the vehicle interior camera 32. However, the present invention is not limited to this configuration. For example, in a case where the vehicle stop support system according to the present invention is equipped in a vehicle provided with an infrared sensor for detecting a body temperature or a pulse wave of a driver, a seat sensor for detecting a center-of-gravity position or a pulse wave depending on the posture of the driver, or the like, the abnormality detection part in the present invention may be configured to detect the physical abnormality of the driver based on detection information from such a sensor.

In the above embodiment, the required time period estimation part 57 of the ECU 5 is configured to search a course to each of the stop point candidates and determine a vehicle speed pattern of the vehicle 2 when the vehicle 2 travels along the course. However, the present invention is not limited to this configuration. For example, the required time period estimation part in the present invention may be configured to instruct the navigation device to perform search of the course and determination of the speed pattern, and, based on information provided from the navigation device, estimate the required time period.

In the above embodiment, the rear-end collision risk at each of the stop point candidates is set such that it continuously increases along with a decrease in the following vehicle visible distance with respect to each of the stop point candidates. However, the present invention is not limited to this configuration. For example, the rear-end collision risk in the present invention may be set such that it increases stepwisely along with a decrease in the following vehicle visible distance.

In the above embodiment, the rear-end collision risk at each of the stop point candidates is set such that it continuously increases along with an increase in the relative speed of the following vehicle with respect to the vehicle 2 at the stop point candidate. However, the present invention is not limited to this configuration. For example, the rear-end collision risk in the present invention may be set such that it increases stepwisely along with an increase in the relative speed.

LIST OF REFERENCE CHARACTERS

1: vehicle stop support system (system)
2: vehicle
51: abnormality detection part
53: target time period setting part
55: candidate detection part
57: required time period estimation part
59: risk estimation part
67: stop point setting part
68: vehicle control part
69: storage part
SP: stop point

The invention claimed is:

1. A vehicle stop support system for supporting stop of a vehicle which is traveling, comprising:
an abnormality detection part for estimating a disorder or a disease developing in a body of a driver;
a target time period setting part for setting a target time period based on the disorder or the disease estimated by the abnormality detection part;
a candidate detection part for detecting a plurality of stop point candidates which exist in a traveling direction of the vehicle;
a required time period estimation part for estimating a time period required to reach each of the stop point candidates;
a risk estimation part for estimating a rear-end collision risk which is a risk that, when assuming that the vehicle stops at each of the stop point candidates, the vehicle will be rear-ended by a following vehicle;
a stop point setting part for setting a stop point; and
a vehicle control part for controlling the vehicle to travel to the stop point and stop at the stop point,
wherein the vehicle stop support system is configured to execute the following steps in order:
a first step of estimating the disorder or the disease developing in the body of the driver;
a second step of setting the target time period based on the disorder or the disease estimated in the first step;
a third step of detecting the plurality of stop point candidates;
a fourth step of estimating the time period required to reach each of the stop point candidates detected in the third step;
a fifth step of narrowing down the plurality of stop point candidates detected in the third step by selecting and leaving, among the plurality of stop point candidates detected in the third step, one or more stop point candidates each satisfying a condition that the required time period estimated in the fourth step is equal to or less than the target time period set in the second step and further by excluding, among the plurality of stop point candidates detected in the third step, one or more stop point candidates each satisfying a condition that the required time period estimated in the fourth step is larger than the target time period set in the second step;
a sixth step of estimating the rear-end collision risk which is a risk of sustaining a rear-end collision assuming that the vehicle stops at each of the stop point candidates narrowed down in the fifth step; and a seventh step of setting, as the stop point, one of the stop point candidates narrowed down in the fifth step which is lowest in terms of the rear-end collision risk estimated in the sixth step.

2. The vehicle stop support system according to claim 1, wherein the risk estimation part is operable to estimate the rear-end collision risk such that it becomes higher as a following vehicle visible distance with respect to each of the plurality of stop point candidates becomes smaller.

3. The vehicle stop support system according to claim 2, wherein the risk estimation part is operable to estimate the rear-end collision risk such that it becomes higher as a relative speed of the following vehicle with respect to the vehicle which stops at each of the plurality of stop point candidates becomes larger.

4. The vehicle stop support system according to claim 3, wherein the risk estimation part is operable to estimate the relative speed, based on an upper speed limit assigned to each of the plurality of stop point candidates in accordance with law or regulation.

5. The vehicle stop support system according to claim 1, wherein the risk estimation part is operable to estimate the rear-end collision risk at each of the stop point candidates, such that the rear-end collision risk is lower when the stop point candidate is present in a road shoulder than when the stop point candidate is present only within a road.

6. The vehicle stop support system according to claim 5, wherein the risk estimation part is operable to estimate the rear-end collision risk at each of the stop point candidates, such that the rear-end collision risk is lower when the stop point candidate is present in an emergency parking bay than when the stop point candidate is present in the road shoulder.

7. The vehicle stop support system according to claim 1, wherein the target time period setting part sets the target time period corresponding to the disorder or the disease estimated by the abnormality detection part, and wherein, in the second step, the target time period corresponding to the disorder or the disease estimated in the first step is set.

8. A vehicle stop support system for supporting stop of a vehicle which is traveling, comprising:

an abnormality detection part for estimating a disorder or a disease developing in a body of a driver;

a target time period setting part for setting a target time period corresponding to the disorder or the disease estimated by the abnormality detection part;

a candidate detection part for detecting a plurality of stop point candidates which exist in a traveling direction of the vehicle;

a required time period estimation part for estimating a time period required to reach each of the stop point candidates;

a risk estimation part for estimating a rear-end collision risk which is a risk that, when assuming that the vehicle stops at each of the stop point candidates, the vehicle will be rear-ended by a following vehicle;

a stop point setting part for setting a stop point; and a vehicle control part for controlling the vehicle to travel to the stop point and stop at the stop point, wherein the stop point setting part is operable to set, as the stop point, one of the plurality of stop point candidates which satisfies a condition that the required time period estimated with respect thereto is equal to or less than the target time period and which is lowest in terms of the rear-end collision risk.

* * * * *